(12) United States Patent
Picciotto et al.

(10) Patent No.: US 9,024,535 B2
(45) Date of Patent: May 5, 2015

(54) STABILIZED LIGHT SOURCE HAVING LUMINANCE FEEDBACK CONTROL

(75) Inventors: Carl Picciotto, Menlo Park, CA (US); Glen Eric Montgomery, San Jose, CA (US); Jeffrey DiCarlo, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 894 days.

(21) Appl. No.: 13/259,401

(22) PCT Filed: Oct. 14, 2009

(86) PCT No.: PCT/US2009/060704
§ 371 (c)(1),
(2), (4) Date: Sep. 23, 2011

(87) PCT Pub. No.: WO2011/046552
PCT Pub. Date: Apr. 21, 2011

(65) Prior Publication Data
US 2012/0025715 A1   Feb. 2, 2012

(51) Int. Cl.
*H05B 37/04* (2006.01)
*H05B 37/02* (2006.01)

(52) U.S. Cl.
CPC .............. *H05B 37/0218* (2013.01); *Y02B 20/46* (2013.01)

(58) Field of Classification Search
CPC ........... H05B 37/0218; H05B 33/0803; H05B 33/0851; H05B 33/0893; H05B 37/03; H05B 33/0818; H05B 33/0821; H05B 33/0842; H05B 33/0845; Y02B 20/46

USPC ........ 315/112, 129, 149, 150, 158, 291, 308, 315/309, 160
See application file for complete search history.

(56) References Cited

U.S. PATENT DOCUMENTS

| 6,078,208 A   * | 6/2000  | Nolan et al. ................... 327/512 |
| 6,963,170 B2 * | 11/2005 | Higgins ........................ 315/134  |
| 7,566,865 B2 * | 7/2009  | Harder .......................... 250/238 |

(Continued)

FOREIGN PATENT DOCUMENTS

CN            1841161        10/2006

OTHER PUBLICATIONS

International Search Report and Written Opinion dated Jul. 14, 2010 issued on PCT Patent Application No. PCT/US2009/060704 filed on Oct. 14, 2009.

*Primary Examiner* — Douglas W Owens
*Assistant Examiner* — Amy Yang
(74) *Attorney, Agent, or Firm* — HP Patent Department; Steve Webb

(57) ABSTRACT

An optical lighting apparatus having a constant luminance with a drive current controlled by a controller unit. A temperature controlled photodetector indirectly monitors the luminance and informs the controller when a change in luminance has occurred so that the controller can make appropriate adjustments to the drive current. Also disclosed is a method of regulating the drive current to a light source to enable the luminance to remain fixed and independent of fluctuations in ambient temperature. A temperature compensated photodetector senses the amount of light reflected off a diffuser lens and feeds back the output to a controller circuit which regulates the drive current to the light source. The lighting apparatus has application in calibrating imaging systems, such as digital cameras, and for scanning devices.

16 Claims, 3 Drawing Sheets

(56) References Cited

U.S. PATENT DOCUMENTS

| | | |
|---|---|---|
| 2007/0115685 A1 | 5/2007 | Kondo et al. |
| 2007/0210722 A1 | 9/2007 | Konno |
| 2007/0291198 A1 | 12/2007 | Shen |
| 2008/0062070 A1 | 3/2008 | De Oto et al. |
| 2010/0096993 A1* | 4/2010 | Ashdown et al. ............. 315/113 |

* cited by examiner

STABILIZED LIGHT SOURCE HAVING LUMINANCE FEEDBACK CONTROL

BACKGROUND OF THE INVENTION

The present invention relates generally to imaging devices and light sources, such as light emitting diodes (LEDs), and more particularly to a light source having a stable known luminance (brightness) which is independent of changes in ambient temperature for use in calibrating light sensors such as are in digital cameras and other imaging or processing devices.

Precision light sources have a wide variety of applications including calibrating digital cameras or light meters during the manufacturing process. To be useful for such applications the light sources need to have a constant luminosity, i.e., the intensity over some unit area needs to be constant over time and with changes in ambient conditions such as temperature. Most LEDs have good illumination characteristics and are often used as precision light sources due also in part to their size, cost to manufacture, spectral stability, and capability to emit light of different wavelengths. Yet, as is true of similar devices and light sources in general, the luminosity of LEDs varies with both temperature and age. When a current is initially applied, there is an immediate internal heating of the device causing a rapid change in luminosity. Even if allowed to "warm up" to reach an operating thermal state of equilibrium, the temperature of the device, and thus the luminosity, varies with changes in ambient temperature. In addition leaving the devices on for an extended period to maintain a constant temperature reduces the useful lifetime and can be costly. To overcome temperature variations, one could measure the temperature of the LEDs and make an appropriate correction of the drive current, such as is described in U.S. Pat. No. 6,127,784. This technique also may be costly when there are multiple LEDs being used (e.g., >100), and in addition measurement of temperature is not necessarily sufficient to accurately infer light output. Furthermore even if kept at a constant temperate, the luminosity will vary with aging of the devices. Another technique may be to measure the on-resistance (or voltage drop) at each light source to infer the temperature, and therefore to infer a corresponding light output. And yet another technique would be to maintain the light source at a fixed or constant temperature to insure there is a constant light output. Since there is significant self heating such temperature regulation would work best if the devices were cooled, rather than heated, which is generally more costly than heating systems and still this does not compensate for aging drifts in luminance or for the cost of multiple light sources.

While the following discussion focuses primarily on an economical long lasting solution to these problems, the invention has utility for many other types of applications than a calibrated light source having a constant luminance level for setting the sensitivity of digital cameras. For example our invention could be used for stabilizing the output of one or more light projectors in an image projection system.

Further limitations and disadvantages of conventional and traditional approaches will become apparent to one skilled in the art, through comparison of such devices with a representative embodiment of the present invention as set forth in the remainder of the present application with reference to the drawings.

BRIEF DESCRIPTION OF THE DRAWINGS

For a better understanding of the invention as well as further features thereof, reference is made to the following description which is to be read in conjunction with the accompanying drawings wherein.

DETAILED DESCRIPTION

Figure 1:
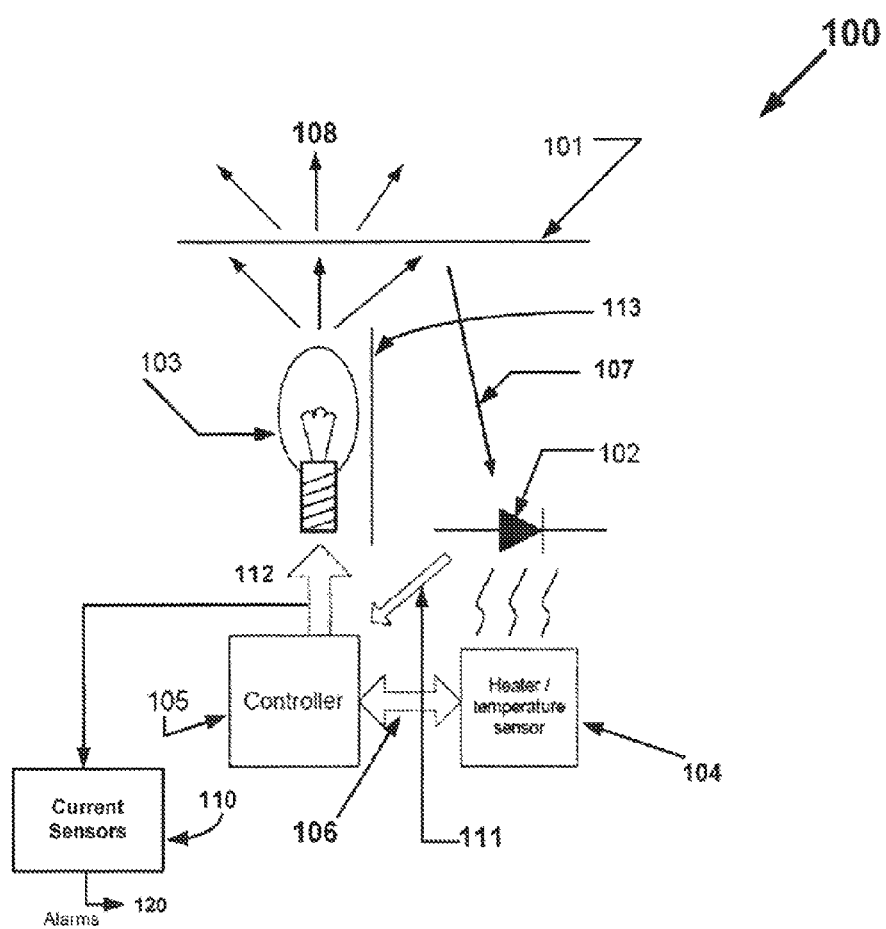
FIG. 1 is a schematic diagram showing a first preferred embodiment of the light source and control apparatus in accordance with the present invention.

Reference will now be made in detail to a representative embodiment of the present invention shown in the accompanying drawings, wherein like reference numerals refer to like elements throughout. Furthermore, in the following detailed description, numerous specific details are set forth in order to provide a thorough understanding of the present invention. However, it will be obvious to one of ordinary skill in the art that the present invention can be practiced without these specific details The present invention provides, among other things, a system design that regulates the flow of current to one or more light sources, preferably LEDs, in response to the detected light output as measured by a temperature controlled photodiode. FIG. 1 depicts precision lighting apparatus 100 comprising a light source 103, an optical light diffuser 101, a photodetector 102, a temperature regulated heater 104, and a controller circuit 105. Light source 103 is depicted as an incandescent lamp, but in the preferred embodiment is an array of multiple LEDs mounted on a printed circuit hoard. As shown in U.S. application Ser. No. 11/054,209, filed on Feb. 8, 2005, entitled "Imaging Device Analysis Systems and Imaging Device Analysis Methods" (hereinafter the '209 application), the LEDs maybe configured in a simple closely-packed array of light emitting devices configured to emit light of the same wavelength and intensity. Optical light diffuser 101 may comprise a simple frosted glass plate or a translucent polycarbonate plastic lens both of which have a fairly high transmission efficiency, are wavelength independent, and are designed to eliminate hotspots in the radiated light 108 where an array of individual LEDs is employed as light source 103. The objective is to present a substantially uniform light intensity across the face of diffuser 101 that remains constant over time and temperature. Other configurations of optical diffuser 101 may be utilized to output light 108 as a uniform wavefront. A portion of the radiated light 107 gets reflected or scattered back from diffuser 101 and gets picked up by photodetector 102. In the exemplary embodiment shown in the '209 application, a copy of which is incorporated herein by reference, photodetector 102 senses the intensity of the reflected light and generates an output signal 111 which is proportional to the detected light falling on the device. Suitable photodetectors would include photodiodes, phototransistors or CDS cells. The generated output signal 111 from photodetector 102 is applied to controller circuit 105 which adjusts the drive current, via a plurality of individual circuits 112, of light source 103 in response to the intensity of the reflected light 107. As the measured intensity of light begins to drop, controller 105 makes corresponding changes in the drive current to maintain a constant luminance as measured by photodetector 102. Since reflected light 107 represents a combined light output from many individuals light sources 103, each LED contributes substantially equally to the overall diffused light output. By measuring a combined light output, the failure or partial failure of a single device only drops the light output by 1/n where n is the number of individual light sources there are. But since the reflected light 107 is representative of the composite output, a proportionate change can be made to the other individual devices to increase the total luminance by 1/n.

Figure 3:
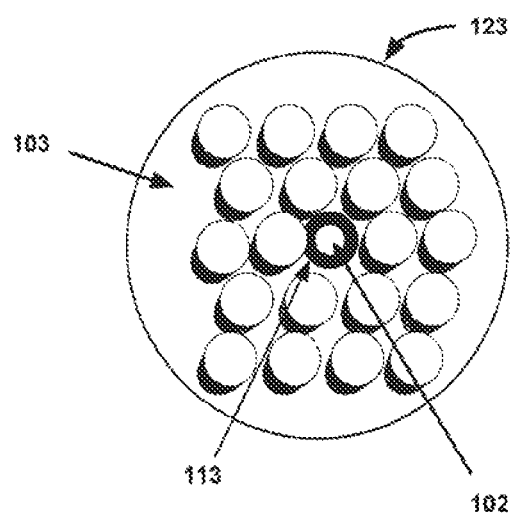
FIG. 3 is a perspective top view of one embodiment of the light source incorporating the present invention.

The luminance characteristics of LEDs are known to drop 50% or more for a approximate change in ambient temperature of 35° C. Because photodetectors are know to exhibit similar changes in output voltage for any change in ambient temperate, photodetector 102 is preferably temperature-stabilized to insulate it from similar temperature swings and to insure that the compensation applied by controller 105 accurately adjusts for any change in luminance as measured by photodetector 102. A heater circuit and temperature sensor device 104 shown in FIG. 1 is a simple heater regulated by a thermistor or similar device to keep the surrounding temperature of photodetector 102 tightly controlled. By setting the heater temperature to be slightly above the highest ambient temperature to be expected, a simple heater is all that is needed to maintain a constant operating temperature of photodetector 102. In the physical housing shown in the '209 application or as depicted in FIG. 3, all that is needed is a power transistor mounted beneath the circuit board 123 where photodetector 102 is mounted to maintain the desired temperature. Other physical surroundings might require an oven enclosure to maintain the temperature of photodetector 102 to remain constant. A thermistor, a thermocouple, or a temperature sensing integrated circuit (shown only generally as block 104) for sensing the ambient temperature of photodetector 102 would work best if mounted directly adjacent the photodetector, since it is the temperature of photodetector 102 that is of interest and not some other temperature within the physical housing. Certainly other physical configurations and widely expected temperature swings in ambient conditions would require a more elaborate setup to maintain photodetector 102 at the desired fixed temperature. But given the preferred embodiment shown in the '209 application, we could easily maintain temperature swings at photodetector 102 under=1° C. to keep the radiated light output 108 at a desired fixed intensity. (In the preferred embodiment depicted in the '209 application and in the embodiment shown in FIG. 3, photodetector 102 is mounted in the center of an LED array. To prevent the photodetector from picking up light directly from adjacent LEDs, we have mounted an opaque tubular open-ended shroud 113 around photodetector 102 so that it detects only reflected light 107 from a plurality of individual LEDs 103 rather than direct light from LEDs 103. This is shown pictorially in FIG. 1 and FIG. 3 as light shield 113.)

Another advantage of apparatus 100 is that it will maintain a stable fixed light output, not just with changes in ambient temperature, but also with changes in output luminance due to aging of the light sources themselves or due to a failure of one or more of the individual devices. Although LEDs typically have lifetimes that exceed 100,000 hours, they do eventually fail and need to be replaced. So as the output 108 begins to drop, for whatever reason, the output 111 of photodetector 102 tells the controller 105 that the luminance is dropping, as is indicated by a drop in reflected light 107, and the drive current 112 automatically increases the operating point of the LEDs 103 to maintain a constant luminance.

And yet another advantage of this particular light emitting apparatus, by being able to indirectly sense the output light 108 with photodetector 102, it is possible to have multiple luminance settings. To achieve a desired luminance as measured by photodetector 102, the number of light emitting devices of source 103 can be varied between, for example, 20 for a low output setting, 40 for a medium setting, and 60 for a high setting. Such settings are possible by making appropriate adjustments within controller circuit 105. In the embodiment shown in FIG. 3, for a high output luminance setting all 20 of the LEDs would be powered. For a medium setting the 6 LEDs adjacent to photodetector 102 could be turned off, and for a minimum setting every other LED could be turned off (Probably the controlling concept would be to try to maintain a uniform light front with as little variation at the diffuser as is possible, i.e., minimize any "hot spots.") In another embodiment controller 105 could be set up to output appropriate drive currents to the light emitting devices 103. This could either be done with a calibrating instrument or by simply scaling the drive currents from low, to medium, and to high. It simply depends upon the desired intensities one needs for a particular application.

In the preferred embodiment controller 105 was a microcontroller following a PID algorithm to maintain temperature stability of the photodetector 102 and a different algorithm to control the drive currents 112. Certainly any number of commercially available microcontrollers could be used for such purposes, such as the Model PIC16F877 Microcontroller made by Microchips Inc., located at 218 Henry Avenue, St. Louis, Mo. 63011 USA.

By setting preset limits on the amount of drive current 112 which may reasonably be expected to power light source 103, it is possible to set up alarms when these limits are exceeded whether + or −. This is schematically shown in FIG. 1 as current sensors 110 with an alarm output line 120. Although this is shown as a device external to controller 105, most microcontrollers have such functionality built into the devices themselves. And alarm output line 120 could be a simple on/off driver connected to a visual alarm lamp or some other device. When output 120 switches on, this is an indication to the user that it is time to change out the light sources 103 or otherwise investigate why the current has exceeded a preset threshold.

Figure 2:
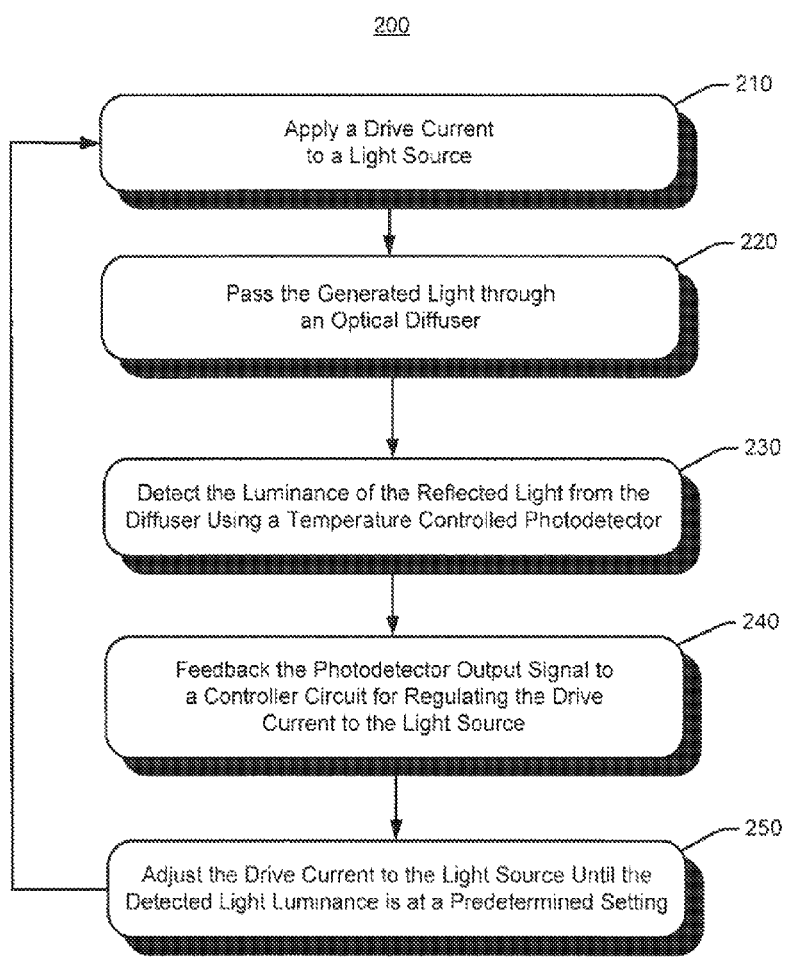
FIG. 2 is a flowchart illustrating exemplary operations for implementing the preferred embodiment of the present invention.

FIG. 2 is a flowchart illustrating exemplary operations 200 for controlling the luminance of light source 103 in accordance with the preferred embodiment of this invention. At initial step 210 an initial drive current is applied to light source 103. Generated light is immediately detected at 220 by photodetector 102. At step 230 photodetector 102 detect the Luminance of the reflected light 107 and generates an output signal 111 proportional to the level of the detected light which is fedback to controller circuit 105 at step 240. At step 250 controller 105 adjusts the drive current 112 either up or down to light source 103 until the luminance is adjusted to the predetermined setting.

While aspects of the present invention have been described with reference to certain embodiments, it will be understood by those skilled in the art that various changes may be made and equivalents may be substituted without departing from the scope of the representative embodiments of the present invention. For example although apparatus 100 has been characterized for use in calibrating light sensors such as are in digital cameras, it has applications in optical devices where a focused light beam is deflected in a scanning optical unit such as a laser printer or scanner. In addition, many modifications may be made to adapt a particular situation to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. Optical lighting apparatus having a constant luminance output comprising:

a plurality of light-emitting devices having a desired luminance output;

a light diffuser positioned to receive the output of the light-emitting devices;

a photodetector adapted to receive light energy reflected off the light diffuser and for generating an output signal proportional to the amount of received incident light at the photodetector;

an optical insulator positioned between the light-emitting devices and the photodetector to block the photodetector from receiving light directly from the light-emitting devices;

a controller circuit for variably controlling the drive current to the light-emitting devices in response to the output signal from the photodetector;

a temperature sensor proximate to the photodetector for sensing the temperature thereat;

a heater proximate to the photodetector and having a preset temperature greater than a highest expected ambient temperature to maintain the temperature of the photodetector at the preset temperature to permit the output luminance from the light-emitting devices to be constant and independent of changes in ambient temperature less than the highest expected ambient temperature.

2. The optical lighting apparatus as in claim 1 wherein the plurality of light-emitting devices further comprises a plurality of light-emitting diodes (LEDs) configured in a compact array.

3. The optical lighting apparatus as in claim 2 wherein the photodetector further comprises a photodiode positioned proximate the center of the LED array and adjacent the LEDs, wherein the optical insulator is a circular shroud disposed laterally around the photodiode.

4. The optical lighting apparatus as in claim 3 further comprising:

a current sensor for sensing the drive current to the plurality of LEDs and for generating an alarm signal when the sensed drive current exceeds a predetermined current threshold.

5. The optical lighting apparatus as in claim 4 wherein said temperature sensor further comprises a thermistor.

6. A method of regulating the drive current to a plurality of light emitting sources to maintain the luminance thereof at a constant level independent of changes in ambient temperature, said method comprising:

controlling the drive current to the plurality of light emitting sources to have an output light with a predetermined luminance;

passing the output light through an optical diffuser and optically coupling a reflected portion of the output light from the optical diffuser to a photodetector while shielding the photodetector from receiving the output light directly from the light emitting sources;

generating a signal at the photodetector proportional to the luminance of the reflected portion of output light received at the photodetector;

adjusting the drive current to the plurality of light emitting sources so that the luminance of the output light remains at a predetermined fixed level in accordance with the photodetector signal; and measuring the ambient temperature at the photodetector while applying heating to maintain the temperature of the photodetector at a preset temperature greater than a highest expected ambient temperature when the ambient temperature is less than the highest expected ambient temperature.

7. The method of claim 6 wherein the plurality of light emitting sources comprises a plurality of LEDs configured in a compact array.

8. The method of claim 7 wherein the photodetector further comprises a photodiode positioned proximate the center of the LED array and adjacent the LEDs, wherein the optical insulator is a circular shroud disposed laterally around the photodiode.

9. The method of claim 8 further comprising:

sensing the drive current to the plurality of light-emitting devices; and generating an alarm signal when the sensed drive current exceeds a predetermined threshold.

10. An imaging device calibration apparatus comprising:

a plurality of light-emitting diodes arranged in a compact array having a predetermined luminance output;

a light diffuser positioned to receive the output of the light-emitting diodes;

a photodetector adapted to receive light energy reflected off the light diffuser and for generating an output signal proportional to the amount of received incident light at the photodetector;

an optical insulator positioned between the light-emitting diodes and the photodetector to block the photodetector from receiving light directly from the light-emitting diodes;

processing circuitry configured to variably control the drive current to the light-emitting diodes in response to the output signal from the photodetector to permit the calibration of the imaging device;

a temperature sensor proximate to the photodetector for sensing the surrounding temperature;

a heater proximate to the photodetector and having a preset temperature greater than a highest expected ambient temperature to maintain the temperature of the photodetector at the preset temperature to render the response of the photodetector to be substantially insensitive to changes in ambient temperature and permit the regulation of the output luminance from the light-emitting diodes to be constant and independent of changes in ambient temperature of the imaging device calibration apparatus.

11. The imaging device calibration apparatus as in claim 10 wherein the optical insulator is configured as an opaque tubular shroud open at least at one end.

12. The imaging device calibration apparatus as in claim 11 wherein the photodetector further comprises a photodiode positioned proximate the center of the light-emitting diode array and adjacent the LEDs, the opaque tubular shroud disposed laterally around the photodiode.

13. The imaging device calibration apparatus as in claim 10 wherein the processing circuitry is also configured to have multiple drive current settings corresponding to stepped luminance settings of the light-emitting diodes.

14. Apparatus for regulating the drive current to an array of LEDs having a desired luminance and for stabilizing the luminance to be independent of fluctuations in ambient temperature, said apparatus comprising:

a light diffuser positioned to receive the light generated from the LEDs;

a photodetector adapted to receive only light energy reflected off of and backscattered from the light diffuser, said photodetector for generating an output signal proportional to the amount of received incident light at the photodetector;

a controller circuit for variably regulating the drive current to the LEDs in response to the output signal from the photodetector;

a temperature sensor proximate to the photodetector;

a heater proximate to the photodetector and having a preset temperature greater than a highest expected ambient temperature to maintain the temperature of the photodetector at the preset temperature to permit the output luminance of the LEDs to be constant and independent of changes in ambient temperature less than the highest expected ambient temperature.

15. The apparatus of claim 14 wherein said temperature sensor comprises a temperature sensing integrated circuit.

16. The apparatus of claim 15 wherein said photodetector is centrally positioned within the array of LEDs, adjacent to the LEDs, and enclosed laterally within an open-ended opaque tubular shroud to shield it from receiving direct light from the LEDs.

\* \* \* \* \*